Feb. 7, 1956     L. H. LEONARD, JR     2,733,575
CONTROL ARRANGEMENT FOR ABSORPTION REFRIGERATION SYSTEMS
Filed April 16, 1953
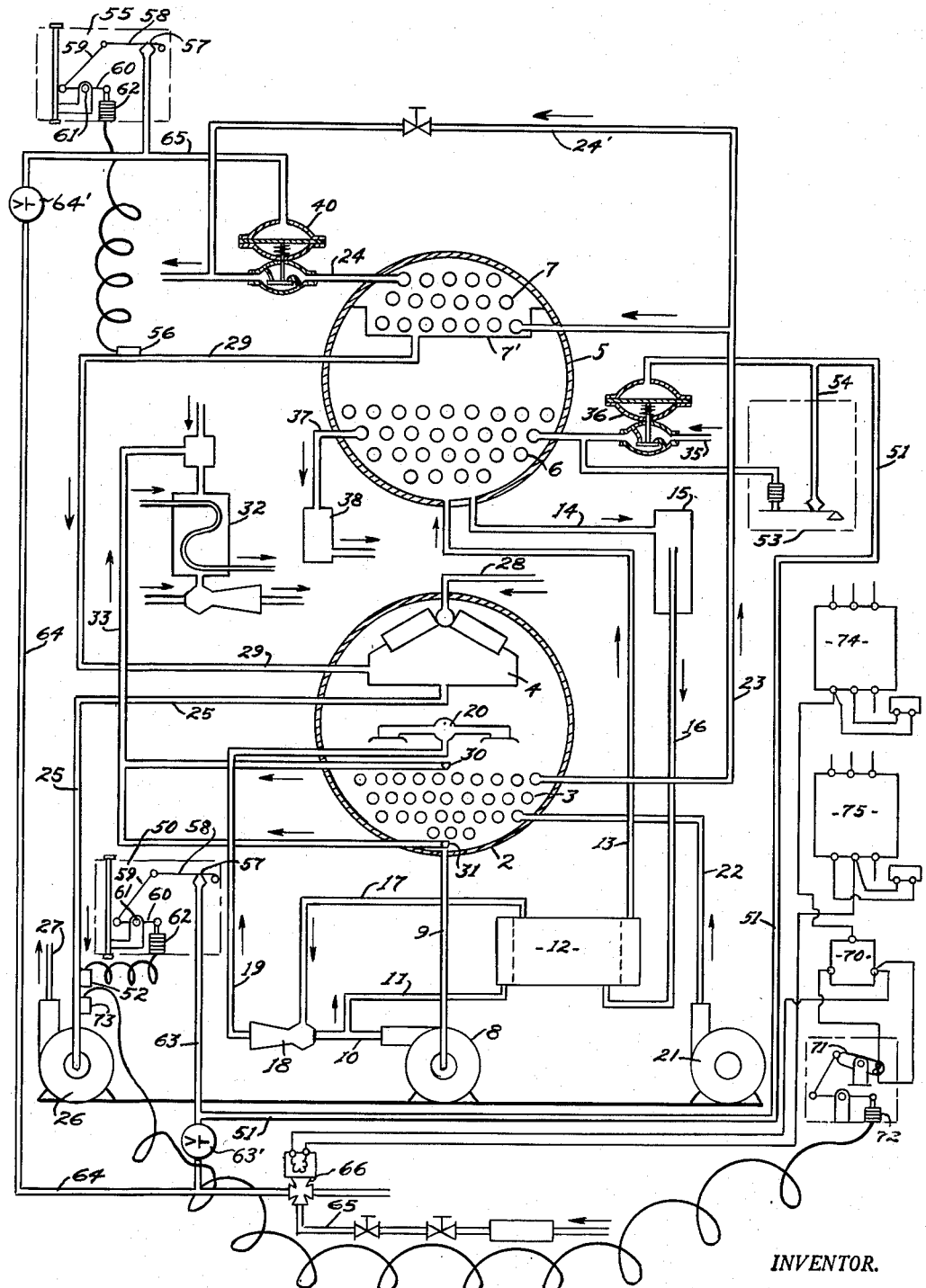
INVENTOR.
Louis Howell Leonard, Jr.
BY

United States Patent Office 2,733,575
Patented Feb. 7, 1956

2,733,575

CONTROL ARRANGEMENT FOR ABSORPTION REFRIGERATION SYSTEMS

Louis Howell Leonard, Jr., East Syracuse, N. Y., assignor to Carrier Corporation, Syracuse, N. Y., a corporation of Delaware Application April 16, 1953, Serial No. 349,184

8 Claims. (Cl. 62—5)

This invention relates to an absorption refrigeration system and, more particularly, to an absorption refrigeration system including water as a refrigerant and a solution of lithium bromide and water as an absorbent, which includes an improved control arrangement for regulating the capacity of the machine and the concentration of solution leaving the generator.

In my copending application, Serial No. 240,645, filed August 7, 1951, now Patent No. 2,722,805, granted Nov. 8, 1955, entitled Control Arrangement for Absorption Refrigeration Systems, there is disclosed and claimed a control arrangement for regulating the capacity of the machine and the concentration of strong solution leaving the generator. While this control arrangement is satisfactory in use, I have found that in certain localities excessive scaling problems are encountered when the control arrangement is employed in an absorption refrigeration system utilizing high pressure steam, that is, steam above a pressure of 12 pounds per square inch gauge.

The chief object of the present invention is to provide an absorption refrigeration system embodying an improved control arrangement which greatly reduces scaling problems encountered during operation of the system.

An object of the present invention is to provide an absorption refrigeration system employing water as a refrigerant and a solution of lithium bromide and water as an absorbent which embodies an economical control arrangement for regulating the capacity of the machine and the concentration of strong solution leaving the generator.

A further object is to provide an absorption refrigeration system in which the supply of steam to the generator is regulated in response to the temperature of chilled water leaving the evaporator and in which supply of condensing water to the condenser is regulated in response to the temperature of condensate leaving the condenser. Other objects of the invention will be readily perceived from the following description.

This invention relates to an absorption refrigeration system which includes an absorber, an evaporator, a generator and a condenser. The absorber and evaporator preferably are disposed in a shell. If desired, the generator and condenser may be disposed in a second shell which may be placed above the first shell. The absorber and the generator are connected the permit flow of strong solution from the generator to the absorber and flow of weak solution from the absorber to the generator. The condenser serves to condense refrigerant vapor boiled off in the generator, the condensate being returned to the evaporator where it is flash cooled, the flashed vapor passing to the absorber to be absorbed by solution therein. Condensing water is passed through the absorber and the condenser. A valve is disposed in the condensing water line to regulate flow of condensing water through the condenser and hence the ability of the condenser to perform work. A thermostatic control is provided which is actuated in response to the temperature of vapor condensate leaving the condenser thereby regulating flow of condensing water to the tubes of the condenser. A by-pass is provided about the condenser in order to maintain the flow of condensing water substantially constant through the absorber even though its passage through the tubes of the condenser be retarded or throttled. A second valve is placed in the steam supply line leading to the generator. This valve regulates supply of steam to the generator. The second valve is actuated to move toward opened or closed positions by a thermostatic control responsive to the temperature of chilled water leaving the evaporator.

This invention further relates to a method of operation of an absorption refrigeration system in which the steps consist in maintaining substantially constant flow of solution through the system, controlling the ability of the condenser to perform work in response to temperature of vapor condensate leaving the condenser, supplying a heating medium to the tubes of the generator, and regulating the heating medium supplied to the tubes of the generator in response to the work imposed upon the system.

The attached drawing is a diagrammatic view of an absorption refrigeration system embodying the control arrangement of the present invention.

Referring to the attached drawing, I have illustrated an absorption refrigeration system embodying the improved control arrangement. The system comprises a shell 2 containing a plurality of tubes 3 which cooperate with the shell to form an absorber. Placed in shell 2 above absorber 3 is a pan-like member 4 which cooperates with shell 2 to form an evaporator. A second shell 5 preferably is placed above the first shell. Tubes 6 extend in the lower portion of shell 5 and cooperate with shell 5 to form a generator. A plurality of tubes 7 are placed in the upper portion of shell 5 to form a condenser. The tubes 7 cooperate with a pan-like member 7' and with the shell to form a condenser.

A pump 8 withdraws weak solution from absorber 3 through line 9. Pump 8 forwards the weak solution through line 10, line 11, heat exchanger 12, and line 13 to generator 6. Strong solution is withdrawn from generator 6 through line 14 to an overflow arrangement 15, which maintains a desired level of solution in generator 6. From overflow arrangement 15, the strong solution flows through line 16, heat exchanger 12 and line 17 to an ejector 18 which forwards the strong solution the strong solution over the tubes of absorber 3. Pump through line 19 to spray arrangement 20 which sprays the strong solution over the tubes of absorber 3. Pump 8 forwards a portion of weak solution through line 10 to ejector 18. Discharge of the weak solution in ejector 18 serves to induce strong solution from line 17 into the ejector and to forward the mixture of strong and weak solutions to the spray arrangement 20. It will be appreciated that pump 8 maintains a substantially constant flow of solution through the system.

Pump 21 supplies condensing water through line 22 to the tubes 3 of the absorber. The condensing water, after passage through tubes 3, passes through line 23 to the tubes 7 of the condenser. The condensing water, after passage through the tubes of the condenser, is discharged to a cooling tower or drain through line 24. A by-pass line 24' for condensing water is provided about the condenser 7.

Chilled water is withdrawn from evaporator 4 through line 25 by pump 26 and is circulated to a place of use which may be the central station of an air conditioning system through line 27. The chilled water is returned to the evaporator through line 28 and is flash cooled in the evaporator, the flashed vapor passing to the absorber.

Condensate leaves condenser 7 through line 29 and is returned to the evaporator, the flashed vapor passing to the absorber 3 as previously described. It will be appreciated line 29 is sized to maintain the desired pressure differential between condenser 7 and evaporator 4 and to pass a small amount of vapor and non-condensibles from the condenser to the evaporator.

A suitable purge arrangement 32 is provided to remove non-condensible gases from absorber 3. Purge 32 is connected to the absorber by line 33, which is connected to purge lines 30, 31 extending longitudinally of the absorber.

Steam passes to the tubes of generator 6 through supply line 35. A valve 36, hereinafter described, is placed in line 35 to regulate passage of steam to the tubes of the generator 6. Steam condensate leaves the tubes of generator 6 through line 37, a steam trap 38 being provided in line 37 to assure that only condensate leaves the generator.

A normally closed pneumatic valve 40 is placed in line 24 to regulate passage of condensing water through the tubes of condenser 7. Valve 40 is actuated as hereinafter described.

A thermostatic control 50 regulates the pressure of air passing through line 51 to valve 36. Control 50 is actuated by means of a bulb 52 placed adjacent chilled water line 25. Bulb 52 reflects the temperature of chilled water leaving the evaporator 4 which in turn indicates the load imposed upon the system. Preferably, a pressure controller 53 is connected by air line 54 to line 51. Pressure controller 53 is also connected to the steam supply line 35 at a point between valve 36 and the tubes of generator 6 so that pressure in that portion of line 35 is reflected upon the controller 53. Thus, if pressure in line 35 increases beyond a predetermined point, controller 53 is actuated to bleed air from line 51, thereby reducing the air pressure imposed upon valve 36 permitting valve 36 to move toward a closed position reducing the pressure of steam passing to the tubes of generator 6.

A second thermostatic control 55 is provided to regulate operation of pneumatic valve 40 placed in condensing water line 24. Control 55 is actuated by means of a bulb 56 placed in contact with line 29 to reflect temperature of vapor condensate leaving condenser 7.

Controls 50 and 55 are similar in design. Each includes a vent 57 adapted to be closed by a flapper 58 which is supported by a lever 59 connected to an arm 60 pivoted at 61. Arm 60 is connected to a bellow 62 which forms a portion of the thermal responsive system including bulb 52 or bulb 56 respectively, being connected to the bulb by a capillary line. Air pressure is supplied to control 50 through line 63. Air pressure is supplied to control 55 through line 64. Valves 63', 64' are placed in lines 63 and 64 respectively. Line 64 supplies compressed air to valve 40, control 55 bleeding air from such line to move valve 40 toward a closed position responsive to a decrease in the temperature of vapor condensate leaving the condenser. Lines 63, 64 are connected to main air line 65. Preferably, solenoid valve 66 is placed to regulate supply of compressed air through lines 63 and 64 to the controls as a safety measure. Compressed air passes from line 63 through line 51 to valve 36. Thus, pressure in line 51 is regulated by thermostat 50 venting a portion of the air therein to the atmosphere in accordance with the temperature of chilled water. Similarly, control 55 vents the air in line 64 to actuate valve 40 in accordance with the temperature of condensate leaving condenser 7.

A rotary switch 70 is provided which is connected to a mercury switch 71. Mercury switch 71 may be actuated by means of a bellows 72 and a bulb 73 placed adjacent to chilled water line 25. Mercury switch 71 serves in effect as a safety control. An increase in temperature of chilled water above a predetermined point opens the switch thereby closing solenoid valve 66 to prevent supply of air to controls 50 and 55. The starters 74 and 75 actuate the motors (not shown) of the solution pump 8 and chilled water pump 26. A starter for the condensing water pump 21 is not shown since such pump and motor are generally provided by the installer.

The term "weak solution" is used herein to describe a solution weak in absorbing power. The term "strong solution" is used herein to define a solution strong in absorbing power.

The preferred absorbing solution is a solution of lithium bromide and water. The preferred refrigerant is water. With such solution, the maximum allowable solution concentration leaving the generator is 66 per cent. A greater concentration may permit crystallization to occur throughout the system, causing solidification in the heat exchanger and in other portions of the system.

Considering operation of the machine, weak solution is withdrawn from absorber 3 through line 9 by pump 8. Weak solution is forwarded to generator 6 through lines 10, 11 and 13 passing through heat exchanger 12 in heat exchange relation with strong solution returning to the absorber. In the generator, the solution is placed in heat exchange relation with steam passing through the tubes thereof refrigerant being boiled off and passing to the condenser 7. The strong solution leaves the generator through line 14, overflow arrangement 15, line 16, heat exchanger 12 and line 17 to the ejector 18. A mixture of strong and weak solutions is forwarded to the sprays 20 of absorber 3, being sprayed over the tubes therein. Vapor boiled off in the generator passes to condenser 7 where it is condensed by being placed in heat exchange relation with condensing water passing through the tubes of the condenser. The vapor condensate passes to evaporator 4 through line 29. The vapor condensate is flash cooled in the evaporator together with the chilled water returning through line 28. The flashed vapor passes downward about the evaporator 4 to the absorber 3 where it is absorbed by solution therein.

Chilled water leaves the evaporator 4 through line 25 and is forwarded to a place of use through line 27 by pump 26. The chilled water returns to the evaporator from the place of use through line 28 and is sprayed in the evaporator being flash cooled therein.

The capacity of the system is controlled by means of valve 36 which regulates supply of steam to the generator 6, the capacity of the system being regulated in response to the load imposed upon the system, as indicated by the temperature of chilled water leaving evaporator 4. Control 50 is actuated in response to the temperature of chilled water leaving evaporator 4 as indicated by bulb 52. Actuation of control 50 permits more or less compressed air to bleed through vent 57 thus varying the air pressure imposed upon the diaphragm of valve 36 to move valve 36 toward opened or closed positions. Thus the pressure of steam supplied to generator 6 is regulated in accordance with the temperature of chilled water leaving the evaporator 4.

As a safety measure, pressure controller 53 is provided. Assuming pressure of steam in line 35 between valve 36 and the generator increases beyond the desired point, such pressure reflects upon controller 53 to bleed compressed air from line 51, thereby varying the air pressure imposed upon the diaphragm of valve 36, permitting valve 36 to move toward opened or closed positions.

Concentration of solution leaving the generator is regulated by means of valve 40 placed in line 24 to regulate the supply of condensing water passing through the tube of the condenser. Thermostatic control 55 is actuated by bulb 56 responsive to the temperature of vapor condensate leaving condenser 7 to bleed air from line 64, thereby varying the air pressure imposed against the diaphragm of valve 40, to move valve 40 toward opened or closed positions to regulate condensing water passing through the condenser. It will be appreciated control 55 serves to maintain a more or less constant condensing temperature in condenser 7.

At partial load, the decrease in the load is indicated by a decrease in the temperature of chilled water leaving the evaporator. Bulb 52 reflects this decrease in temperature of chilled water leaving the evaporator so that control 50 is actuated to bleed compressed air from line 51, decreasing the pressure in line 51. The decrease in pressure in line 51 actuates valve 36 to move toward a closed position thereby decreasing steam supplied to generator 6. Decrease in steam supply to generator 6 limits the ability of the generator to perform work, thus less refrigerant is boiled off and the solution is more dilute in turn limiting the ability of the absorber to perform work so that the over-all capacity of the machine is decreased.

As the capacity of the machine is decreased by reducing the steam pressure which results in less steam being condensed, less vapor is required to be condensed by the condenser thus temperature of condensate leaving the condenser is decreased. This decrease in temperature of condensate leaving the condenser actuates control 55 to bleed air from line 65 thus moving valve 40 toward a closed position to decrease flow of condensing water through the tubes of condenser 7. Decrease in the amount of condensing water passing through the tubes of the condenser reduces the amount of work performed by the condenser thus permitting a more or less constant condensing temperature to be maintained.

The present invention provides a simple control arrangement for an absorption refrigeration system which reduces greatly the amount of scaling encountered when high pressure steam is employed as the heating medium in the generator because lower condensing temperatures are maintained. Flow of solution through the generator system may be maintained substantially constant while the concentration of the solution may be varied in accordance with change in temperature of condensate leaving the condenser. Capacity of the system is regulated in response to temperature of chilled water leaving the evaporator which indicates a change in load imposed upon the system. The control arrangement provided by the present invention permits satisfactory regulation of an absorption refrigeration machine during operation at full and partial loads. The control arrangement provided permits the machine to be operated over a wide range of capacity.

While I have described a preferred embodiment of the present invention, it will be understood the invention is not limited thereto since it may be otherwise embodied within the scope of the following claims.

I claim:

1. In an absorption refrigeration system, the combination of a generator, a condenser, an evaporator and an absorber placed in a closed circuit, the circuit containing a saline solution as an absorbent and water as a refrigerant, means for maintaining substantially constant flow of solution through the system, a line for supplying a heating medium to the generator in heat exchange relation with solution therein, a pneumatic valve placed in said line, means for imposing air pressure against said valve, a control for regulating the air pressure imposed against said valve responsive to temperature of chilled water leaving the evaporator, a second pneumatic valve for regulating passage of condensing water through the condenser, means for imposing air pressure against said valve, and a second control for regulating the air pressure imposed against said second valve responsive to change in temperature of condensate leaving the condenser.

2. An absorption refrigeration system according to claim 1 in which a pressure controller is provided to vary the pressure imposed against said first valve responsive to a predetermined increase in pressure in the supply line between said valve and the generator.

3. In an absorption refrigeration system, the combination of a shell, an element in said shell cooperating therewith to form an absorber, a second element in said shell disposed above the first element cooperating with the shell to form an evaporator, a second shell, a member in said second shell cooperating therewith to form a generator, a second member in said second shell placed above the first member and cooperating with the shell to form a condenser, the generator, condenser, absorber and evaporator being placed in a closed circuit, the circuit containing a saline solution as an absorbent and water as a refrigerant, means for maintaining substantially constant flow of solution through the system, a supply line for supplying a heating medium to the generator in heat exchange relation with solution therein, a pneumatic valve placed in said line, means for imposing a predetermined air pressure against said valve, a control for varying the air pressure imposed against said valve responsive to change in temperature of chilled water leaving the evaporator, a pneumatic valve for regulating passage of condensing water to the condenser, means for imposing a predetermined air pressure against said valve, and a control for varying the air pressure imposed against said second valve responsive to temperature of vapor condensate leaving the condenser.

4. An adsorption refrigeration system according to claim 3 in which a pressure controller is provided to vary the air pressure imposed against said first valve responsive to a predetermined increase in pressure in the supply line between said first valve and the generator.

5. In the operation of an absorption refrigeration system containing an absorber, a generator and a condenser disposed in a closed circuit and embodying a saline solution as an absorber and water as a refrigerant, the steps which consist in maintaining a substantially constant flow of solution through the system, supplying a heating medium to the generator in heat exchange relation with solution therein, regulating the heating medium supplied to the generator responsive to variation in temperature of chilled water leaving the evaporator, regulating the passage of condensing water through the condenser to vary concentration of solution leaving the generator and varying the flow of heating medium to the generator responsive to a predetermined change in pressure in a line supplying the heating medium to the generator.

6. In an absorption refrigeration system, the combination of a generator, a condenser, an evaporator, and an absorber placed in a closed circuit, the circuit containing a saline solution as an absorbent and water as a refrigerant, means maintaining substantially constant flow of solution through the system, means for supplying steam to the generator in heat exchange relation with solution therein, means regulating the supply of steam to the generator responsive to a change in load imposed upon the system and pressure responsive means associated with said steam supply means, said pressure responsive means being responsive to change in pressure in the steam supply means supplying the steam to the generator to provide additional regulation of said steam supply.

7. An absorption refrigeration system according to claim 6 in which said last mentioned means is responsive to the pressure of the steam.

8. In an absorption refrigeration system, the combination of a generator, a condenser, an evaporator, and an absorber placed in a closed circuit, the circuit containing a saline solution as an absorbent and water as a refrigerant, means for maintaining substantially constant flow of solution through the system, a line for supplying a steam to the generator, a pneumatic valve in said line, means for supplying compressed air to said valve, means for varying the air pressure imposed upon said valve responsive to a change in temperature of chilled water leaving the evaporator, and a pressure controller for varying the pressure imposed against said first valve responsive to a predetermined increase in pressure in the steam supply line between the valve and the generator.

References Cited in the file of this patent

UNITED STATES PATENTS

| | | |
|---|---|---|
| 2,502,104 | Reid | Mar. 28, 1950 |
| 2,565,943 | Berestneff | Aug. 28, 1951 |